(12) United States Patent
Brasselet et al.

(10) Patent No.: US 11,927,737 B2
(45) Date of Patent: Mar. 12, 2024

(54) DEVICES AND METHODS FOR THE CHARACTERIZATION OF THE 3D ORIENTATION OF LIGHT EMITTING DIPOLES

(71) Applicants: Université d'Aix-Marseille, Marseilles (FR); Centre National de la Recherche Scientifique, Paris (FR); CENTRALE MARSEILLE, Marseilles (FR)

(72) Inventors: Sophie Brasselet, Allauch (FR); Valentina Curcio, Marseilles (FR)

(73) Assignees: Université d'Aix-Marseille, Marseilles (FR); Centre National de la Recherche Scientifique, Paris (FR); CENTRALE MARSEILLE, Marseilles (FR)

( * ) Notice: Subject to any disclaimer, the term of this patent is extended or adjusted under 35 U.S.C. 154(b) by 181 days.

(21) Appl. No.: 17/764,851

(22) PCT Filed: Sep. 28, 2020

(86) PCT No.: PCT/EP2020/077057
§ 371 (c)(1),
(2) Date: Mar. 29, 2022

(87) PCT Pub. No.: WO2021/063865
PCT Pub. Date: Apr. 8, 2021

(65) Prior Publication Data
US 2022/0365330 A1 Nov. 17, 2022

(30) Foreign Application Priority Data
Sep. 30, 2019 (EP) .................................... 19306218

(51) Int. Cl.
*G02B 21/36* (2006.01)
*G02B 27/28* (2006.01)

(52) U.S. Cl.
CPC ......... *G02B 21/361* (2013.01); *G02B 21/367* (2013.01); *G02B 27/283* (2013.01)

(58) Field of Classification Search
CPC .... G02B 21/361; G02B 21/367; G02B 21/16; G02B 27/283; G01N 21/644; G01N 21/6458
(Continued)

(56) References Cited

U.S. PATENT DOCUMENTS 9,810,893 B2 11/2017 Backer et al.
11,675,175 B2 * 6/2023 Hong ..................... G02B 21/14
348/79

FOREIGN PATENT DOCUMENTS

EP 2309302 A1 4/2011

OTHER PUBLICATIONS

Backer et al., "Determining the rotational mobility of a single molecule from a single image: a numerical study", Optics Express, Feb. 2015, pp. 4255-4276, vol. 23, No. 4 (22 pages).
(Continued)

*Primary Examiner* — Sherrie Hsia
(74) *Attorney, Agent, or Firm* — Osha Bergman Watanabe & Burton LLP

(57) ABSTRACT

The disclosure may relate to a method for the characterization of the 3D orientation of an emitting dipole within a specimen. The method comprises splitting a light beam emitted by the emitting dipole and exiting an objective lens into a first and a second beams; spatially filtering said first beam by using a spatial frequency filter; splitting each of said filtered first beam and said second beam into two beams linearly polarized using polarizing beam splitters; detecting
(Continued)

with an optical detection unit four beams linearly polarized in a detection plane optically conjugated with the front focal plane of said microscope objective lens; determining, from four intensity images, in a predefined frame of the specimen, the mean orientation and the angular aperture of the distribution of the 3D orientation of the emitting dipole, during an acquisition time of said four intensity images.

15 Claims, 7 Drawing Sheets

(58) Field of Classification Search
USPC .......................................................... 348/79
See application file for complete search history.

(56) References Cited

OTHER PUBLICATIONS

International Search Report issued in PCT/EP2020/077057 dated Dec. 14, 2020 (5 pages).
Written Opinion of the International Searching Authority issued in PCT/EP2020/077057 dated Dec. 14, 2020 (13 pages).
Mehta, S.B. et al.; "Dissection of molecular assembly dynamics by tracking orientation and position of single molecules in live cells"; PNAS, vol. 113, No. 42, Sep. 27, 2016, pp. E6352-E6361 (10 pages).
Ohmachi, M. et al.; "Fluorescence microscopy for simultaneous observation of 3D orientation and movement and its application to quantum rod-tagged myosin V"; PNAS, vol. 109, No. 14, Apr. 3, 2012, pp. 5294-5298 (5 pages).
Brasselet, S. et al.; "Simultaneous detection of 3D orientation and 3D spatial localization of single emitters for nanoscale structural imaging (Conference Presentation)"; Mar. 13, 2019, Retrieved from the internet: https://www.spiedigitallibrary.org/conference-proceedings-of-spie/10883/1088307/Simultaneous-detection-of-3D-orientation-and-3D-spatial-localization-of/10.1117/12.2509891.full?SSO=1&tab-ArticleLink (1 page).
Hohlbein, J. et al.; "Simple scheme for rapid three-dimensional orientation determination of the emission dipole of single molecules"; Applied Physics Letters, vol. 86, No. 12, Mar. 14, 2005, pp. 121104-1-121104-3 (3 pages).
Toprak, E. et al.; "Defocused orientation and position imaging (DOPI) of myosin V"; PNAS, vol. 103, No. 17, Apr. 25, 2006, pp. 6495-6499 (5 pages).
Aguet, F. et al.; "Super-resolution orientation estimation and localization of fluorescent dipoles using 3-D steerable filters"; Optics Express, vol. 17, No. 8, Apr. 13, 2009, pp. 6829-6848 (21 pages).
Valades Cruz, C.A. et al.; "Quantitive nanoscale imaging of orientational order in biological filaments by polarized superresolution microscopy"; PNAS, vol. 113, No. 7, 2016, pp. E820-E828 (9 pages).
Backer, A.S. et al.; "A bisected pupil for studying single-molecule orientational dynamics and its application to three-dimensional super-resolution microscopy"; Applied Physics Letters, vol. 104, No. 19, 2014, pp. 193701-1-193701-5 (5 pages).
Axelrod, D. et al.; "Fluorescence excitation and imaging of single molecules near dielectric-coated and bare surfaces: a theoretical study"; Journal of Microscopy, vol. 247, 2012, pp. 147-160 (14 pages).

\* cited by examiner (PIOR ART)

(PIOR ART)

(PIOR ART)

DEVICES AND METHODS FOR THE CHARACTERIZATION OF THE 3D ORIENTATION OF LIGHT EMITTING DIPOLES

TECHNICAL FIELD

The present disclosure relates to devices and methods for the characterization of the 3D orientation of light emitting dipoles. It further relates to a microscopy system including such device.

PRIOR ART

Super-resolved optical imaging using the spatial localization of isolated molecules (e.g. STORM for "*Stochastic Optical Reconstruction Microscopy*" or PALM for "*Photo-activated Localization Microscopy*") is experiencing rapid developments and represents an important contribution of the imaging devices used in biology. However, these instruments do not enable to determine the orientation in space of the molecules considered. Accurate knowledge of the 3D orientation of an isolated molecule is important for different reasons. First, the orientation of the molecule can modify the determination of its spatial location. Second, knowing the 3D orientation of the molecule enables to get a structural and conformational information of such molecules, e.g. a protein, in addition to the localization information.

FIG. 1 shows the different parameters used in the present description to characterize the 3D orientation of a molecule 10 within a specimen, and more generally an emitting dipole, schematized by an arrow 14 in FIG. 1. Since the orientation of an emitting dipole is varying over time, the 3D orientation may be characterized by a distribution of the orientation during a given measurement time. Such orientation distribution may be defined by a cone 12 of mean orientation ($\rho$, $\eta$) in a frame (X, Y, Z) of the specimen, and of angular aperture (or "wobbling") $\delta$. The angular aperture of the cone also corresponds to the extent of the angular fluctuation of the orientation within a measurement time.

Several approaches are known for measuring the 3D orientation of an isolated molecule while measuring at the same time its 3D location.

A first approach, based on defocus or extended imaging, is shown schematically in FIG. 2A and described for example in Toprak et al. "*Defocused orientation and position imaging (DOPI) of myosin V*", Proc. Natl. Acad. Sci. USA 103, 6495-6499 (2006) or in Aguet et al. "*Superresolution orientation estimation and localization of fluorescent dipoles using 3-D steerable filters*", Opt. Express 17, 6829-6848 (2009).

As illustrated in FIG. 2A, a molecule 10 within a specimen is imaged using an objective lens 22 and a tube lens 24 in a detection plane of a detector 25, wherein the detection plane is defocused. The analysis of the shape of the image, or deformed point spread function (PSF), may inform on the 3D orientation of the molecule if such deformed PSF is sufficiently pixelized.

However, the above technique requires very low aberrations of the optical system as the shape of the PSFs connected to each orientation of space needs to be known a priori. As this approach involves a significant increase in the size of the PSFs of isolated molecules, only specimen with low molecule density can be characterized, and only specimen with very bright molecules. Complex and heavy algorithmic tools are required to determine the molecular orientation of the molecules from the deformation of the PSFs and the angular fluctuation (wobbling) cannot be determined.

A second approach, based on phase mask imaging, is shown schematically in FIG. 2B and described for example in the patent U.S. Pat. No. 9,810,893. According to this technique, a phase mask 26, for example implemented by a spatial light modulator (SLM), is used to characterize the rotational mobility of an individual object 10, e.g. an isolated molecule, within a specimen. The phase mask, e.g. a bisected pupil phase mask, is located in the back focal plane (BFP) of an objective lens 22 or in a plane optically conjugated therewith. A polarizing beam splitter 28 splits light from the specimen as passed via the phase mask 26 and an imaging lens 24 (tube lens) into two imaging channels, to a detector 25. The light detected by the detector 25 includes characteristics indicative of the rotational mobility.

The above technique relies on the fact that 3D orientation information is found in the spatial distribution of intensity in the back focal plane of the objective lens. Thus, by placing a phase mask in the BFP, the image of an isolated molecule is transformed into a deformed PSF that can be analyzed by projection on known bases.

However, experimental implementation of such approach is complex and expensive. As a matter of fact, it requires a very precise alignment of the SLM. Further, this technique suffers from the same limitations as the ones described above for the first approach, as it relies on a deformation of the PSF. In addition, angular fluctuation (wobbling) cannot be determined independently from the spatial localization of the molecule.

A third approach, illustrated schematically in FIG. 2C, doesn't require a deformation of the PSF. It is based on the decomposition of light according to different states of polarization, on emission or detection, and is described for example in Valades Cruz et al. "*Quantitative nanoscale imaging of orientational order in biological filaments by polarized super-resolution microscopy*", Proc. Natl. Acad. Sci. 113 (7) E820-E828 (2016) as well as in Shalin B. Mehta et al. "*Dissection of molecular assembly dynamics by tracking orientation and position of single molecules in live cells*", Proc. Natl. Acad. Sci. 113 (42) E6352-E6361 (2016).

Such approach implements a two- or four-polarization detection scheme using a polarizing beam splitter 28. Signals acquired by the detector 25 for the different states of polarization are compared to retrieve an information on the 2D orientation of a molecule 10 within a specimen.

However, in this approach, the measured orientation and wobbling are projected in the sample plane. Thus, this method doesn't give access to the 3D orientation information and the obtained wobbling value can be biased by the presence of a 3D tilt angle of the molecule.

The present description proposes a new method for characterizing the 3D orientation of an emitting dipole which can be implemented using a simple experimental arrangement compared to the prior art, and which enables to have access to all parameters of the 3D orientation, including the wobbling, with direct data processing. Further, the proposed method doesn't require a deformation of the PSF; it can therefore be applied to the characterization of the 3D orientation of emitting dipoles in dense specimen.

SUMMARY

In the present description, the term "about" means the same as a margin lower and/or greater than 10%, for example 5%, of the respective value.

According to a first aspect, the present disclosure relates to a method for the characterization of the 3D orientation of at least one emitting dipole within a specimen, wherein the specimen is positioned in a front focal plane of a microscope objective lens with a given numerical aperture, the method comprising:

- splitting a light beam emitted by said at least one emitting dipole and exiting said objective lens into a first and a second beams, wherein the first beam is directed to a first detection channel and the second beam is directed to a second detection channel;
- spatially filtering said first beam to select a given range of low spatial frequencies of said first beam, by using a spatial frequency filter arranged in a filtering plane of the first detection channel, wherein said filtering plane is optically conjugated with a back focal plane of said microscope objective lens;
- splitting each of said filtered first beam and said second beam into two beams linearly polarized, thus obtaining four beams linearly polarized having four different directions of polarization;
- detecting with an optical detection unit said four beams linearly polarized in a detection plane optically conjugated with said front focal plane of said microscope objective lens, thus forming four intensity images of said at least one emitting dipole;
- determining, from said four intensity images, in a predefined frame (X, Y, Z) of the specimen, the mean orientation and the angular aperture of the distribution of the 3D orientation of said at least one emitting dipole, during an acquisition time of said four intensity images.

An emitting dipole is for example one of the following: a fluorescent molecule attached to a protein of interest in a cell or tissue; a fluorescent nanoparticle (e.g. a quantum dot); a nonlinear nanocrystal (for instant active for second harmonic generation); a nonlinear label free emitter in a biological sample (e.g. collagen for second harmonic generation, lipid for coherent anti stokes Raman scattering).

The specimen is for example one of the following: a cell labelled with fluorescent molecules labelling some particular proteins of interest (e.g. actin, microtubules, membrane proteins, lipid probes of the plasma membrane); a biological tissue imaged using label free methods such as nonlinear imaging.

In one or other embodiments, said frame of the sample is an orthonormal 3D system consisting of an ordered triplet of axis (X, Y, Z) which are pair-wise perpendicular. By convention in the present direction, the Z axis is parallel to an optical axis of the microscope objective lens.

In the present description, the directions of polarization are defined in a frame (X', Y', Z') in the detection plane corresponding (i.e. optically conjugated) to said frame (X, Y, Z) of the specimen used to determine the mean orientation and angular aperture of the 3D orientation of the at least one emitting dipole.

By convention in the present description, the 0° direction of polarization is parallel to the X' direction of the frame defined in the detection unit and the directions of polarization are angularly spaced in the X'Y' plane of the plane defined in the detection unit.

The proposed method thus implements a four-polarization detection scheme, wherein the beams in two of said four polarization detection channels are spatially filtered in a plane optically conjugated with the back focal plane of the microscope. The applicants have shown that such detection scheme enables to retrieve, from the data processing of the corresponding four intensity images, all three parameters of the orientation of the emitting dipole (mean orientation and wobbling).

Further, with the method for characterization as described above, even characterization of emitting dipoles in dense specimen is possible. As a matter of fact, since the shape of the PSF is not deformed in the imaging process, the image quality is preserved and the intensity in all four polarization channels of the detection unit can be compared from one channel to another by a single pixel-to-pixel operation.

As a consequence, the method applies to the characterization of isolated emitting dipoles, as well as to the characterization of a set of emitting dipoles. In dense specimen, each pixel of the image represents the optical response from a collection of dipoles spatially averaged within the size of the optical resolution of the microscope objective, and temporally averaged over the integration time of the intensity images. This collection of dipoles represents a distribution, oriented towards a given 3D mean direction within a cone of aperture which comprises the wobbling of each individual dipole as well as the alignment aperture of all dipoles.

In one or other embodiments, the spatial filtering of the first beam results from a limitation of the aperture in the filtering plane optically conjugated with the back focal plane of the microscope objective lens. Said limitation if for example obtained using a spatial filter comprising a disc shaped aperture with an inner radius smaller than the full aperture of the first beam in said filtering plane, wherein said full aperture is only limited by the numerical aperture of the microscope objective lens.

In one or other embodiments, a ratio between said limited aperture of said first beam in the filtering plane and said full aperture of said first beam in the filtering plane is smaller than about 0.8, preferably comprised between about 0.2 and about 0.8, preferably between about 0.5 and about 0.8, for example equal to about 0.7.

The applicants have shown that such ratio is a good compromise between the quantity of photons required for the image formation and the precision of the extracted information on the 3D orientation of the emitting dipole. If the ratio is too low, depending on the brightness of the molecules under study, the signal may be too low in the detection plane. On the other hand, if the ratio is greater than about 0.8, the applicants have shown that the 3D orientation of the molecule may not be retrieved in an unambiguous manner, while if the ratio is smaller than about 0.8, its value doesn't have an impact on the precision of the determined value of the 3D orientation.

In one or other embodiments, said four directions of polarization are angularly spaced in four separate identical sectors (or "quadrants") of the [0-180°] range of directions. The applicants have shown that this configuration enables an unambiguous determination of the mean orientation and angular aperture of the distribution of the 3D orientation.

In one or other embodiments, said four directions of polarization are regularly angularly spaced in said four separate quadrants. Regularly angularly spacing the four directions of polarization enables to simplify at most the relationship between the measured intensities and the retrieved parameters. For example, said four directions of polarization are spaced by an angle of 45°, e.g. using four directions of polarizations equal to 0°, 45°, 90°, 135°.

While a regularly angularly spacing of the four directions of polarizations in said four separate quadrants is a natural and easy layout, such layout is not required to retrieve the mean orientation and angular aperture of the distribution of the 3D orientation.

In one or other embodiments, determining the mean orientation and the angular aperture of the distribution of the 3D orientation of said at least one emitting dipole comprises:
- deriving from said four intensity images, a first column vector;
- determining an optical propagation matrix based on said four directions of polarization of said linearly polarized beams and said range of spatial frequencies of said filtered first beam;
- deriving a second column vector from the product of the first column vector and the inverse matrix of the optical propagation matrix;
- deriving from the components of said second column vector the mean orientation and the angular aperture of the distribution of the 3D orientation of said at least one emitting dipole.

The applicants have shown that using four directions of polarization regularly angularly spaced in four quadrants as described above results in an optical propagation matrix that contains some '0' values, making the inversion quicker and easier.

According to a second aspect, the present disclosure relates to devices for the implementation of embodiments of methods according to the first aspect.

In particular, the present disclosure relates to a device for the characterization of the 3D orientation of at least one emitting dipole within a specimen, wherein said device is configured to be connected to a microscope system comprising a microscope objective lens with a given numerical aperture and a detection unit having a detection plane optically conjugated with a front focal plane of said microscope objective lens.

The device according to the second aspect comprises:
- A non-polarizing beam splitter configured to split a light beam emitted by said at least one emitting dipole of said specimen positioned in a front focal plane of said microscope objective lens and exiting said objective lens, into a first and a second beams, wherein the first beam is directed to a first detection channel and the second beam is directed to a second detection channel;
- a spatial frequency filter arranged in the first detection channel, configured for spatially filtering said first beam to select a given range of spatial low frequencies of said first beam, wherein said spatial frequency filter is configured to be positioned in a filtering plane conjugated with a back focal plane of said microscope objective lens when said device is connected to said microscope system;
- in each of said first and second detection channels, respectively a first polarizing beam splitter and a second polarizing beam splitter, wherein said first and second polarizing beam splitters are configured to split each of said filtered first beam and second beam into two beams linearly polarized, thus obtaining four beams linearly polarized having four different directions of polarization;
- a calculation unit configured to determine, from four intensity images resulting from the detection of said four beams linearly polarized by the detection unit in said detection plane, the mean orientation and the angular aperture of the distribution of the 3D orientation of said at least one emitting dipole, in a predefined frame of the specimen, during an acquisition time of said four images.

In the present description, the calculation unit is referred as a single component but may comprise a plurality of distinct electronic components. The calculation unit can for instance be, or comprise, a processing unit such as a central processing unit (CPU), a graphic processing unit (GPU), a Field Programmable Gate Array (FPGA), an Application-Specific Integrated Circuit (ASIC) and/or any type of such processing unit known in the art. The calculation unit and other elements of the device may be connected together, directly or through interconnection electronic components.

The applicants have shown that such simple experimental arrangement compared to the prior art, enables to have access to all parameters of the 3D orientation, including the wobbling, with direct data processing.

In one or other embodiments, the spatial frequency filter is configured to limit the aperture of the first beam in the filtering plane by comparison to a full aperture of the first beam in said filtering plane, wherein said full aperture is only limited by the numerical aperture of the microscope objective lens.

In one or other embodiments, a ratio between said limited aperture of said first beam in the filtering plane and said full aperture of said first beam in the filtering plane is smaller than about 0.8, preferably comprised between about 0.2 and about 0.8, preferably between about 0.5 and about 0.8, for example equal to about 0.7.

In one or other embodiments, the spatial frequency filter is configured to work in transmission and comprises a disc shaped aperture having a given inner radius.

However, the spatial frequency filter may also be configured to work in reflection. For example, it comprises an inclined elliptic shaped mirror, having given external dimensions, the elliptical shape of the mirror enabling to take into account the projection of the first beam on the inclined mirror.

In one or other embodiments, said first and second polarizing beam splitters respectively comprise polarizing beam splitter cubes or Wollaston beam splitters. The first and second polarizing beam splitters may further comprise a half wave plate arranged before said polarizing beam splitter cubes or Wollaston beam splitters. The polarizing beam splitter cubes or Wollaston beam splitters are oriented with angles corresponding to the required polarization projection directions in order to obtain said four beams linearly polarized, each having a specific direction of polarization.

In one or other embodiments, said four directions of polarization are angularly spaced in four separate quadrants of the [0-180°] range of directions.

In one or other embodiments, the device further comprises a relay lens for optically conjugating the back focal plane of the microscope with said filtering plane.

According to a third aspect, the present disclosure relates to microscope systems implementing embodiments of devices according to the second aspect.

In particular, a microscope system according to the third aspect of the disclosure comprises a microscope objective lens with a given numerical aperture, a detection unit and a device according to the second aspect.

In one or other embodiments, the microscope system is configured to work in one of the following illumination configurations: wide field illumination, TIR (for "Total Internal Reflection") illumination, scanning illumination.

In one or other embodiments, the microscope system is configured to work in one of the following detection configurations: pure wide field fluorescence imaging, STORM (for "Stochastic Optical Reconstruction Microscopy"), PALM (for "Photoactivated Localization Microscopy"), nonlinear imaging. Nonlinear imaging may be performed in a "descanned" configuration, according to which a same scanning mirror is used for detection and emission, the emission being spectrally separated from the excitation using a dichroic plate placed after the scanning mirror. Nonlinear imaging may also be performed in a "non-descanned" configuration, according to which detection is not made using the same scanning mirror as emission. Emission may use a dichroic mirror placed just below the microscope objective lens and detection may be made using point detectors collecting the light emitted by each point of the front focal plane of the microscope objective lens.

BRIEF DESCRIPTION OF THE DRAWINGS

The present disclosure will be better understood and other advantages and embodiments will become clear on reading the description that follows, given purely by way of indication and in no way limiting, and by referring to the appended figures.

DETAILED DESCRIPTION OF EMBODIMENTS

Embodiments of the present disclosure will now be described in detail with reference to the accompanying figures. In the following detailed description of embodiments of the present disclosure, numerous specific details are set forth in order to provide a more thorough understanding of the present disclosure. However, it will be apparent to one of ordinary skill in the art that the present disclosure may be practiced without these specific details. In other instances, well-known features have not been described in detail to avoid unnecessarily complicating the description.

In what follows, the term "comprise" is synonym of (means the same as) "include" and "contains", is inclusive and open and does not exclude other non-recited elements.

The following description provides a particular, non-limiting example of a device.

Figure 1:
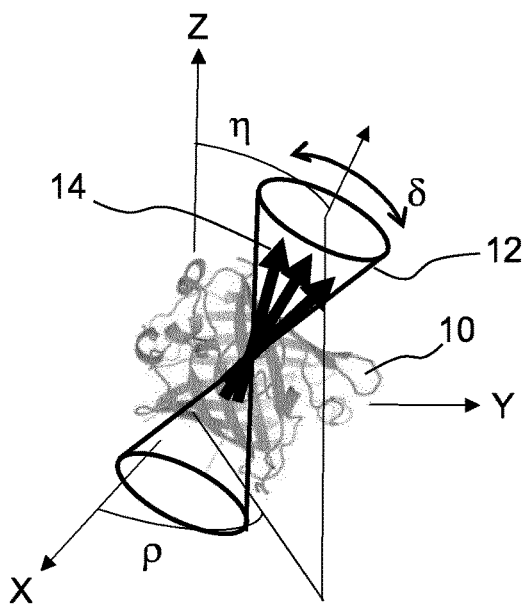
FIG. 1 (already described), a scheme of an emitting dipole showing different parameters (mean orientation and angular aperture) used in the present description to describe the 3D orientation of an emitting dipole.
Figure 2A:
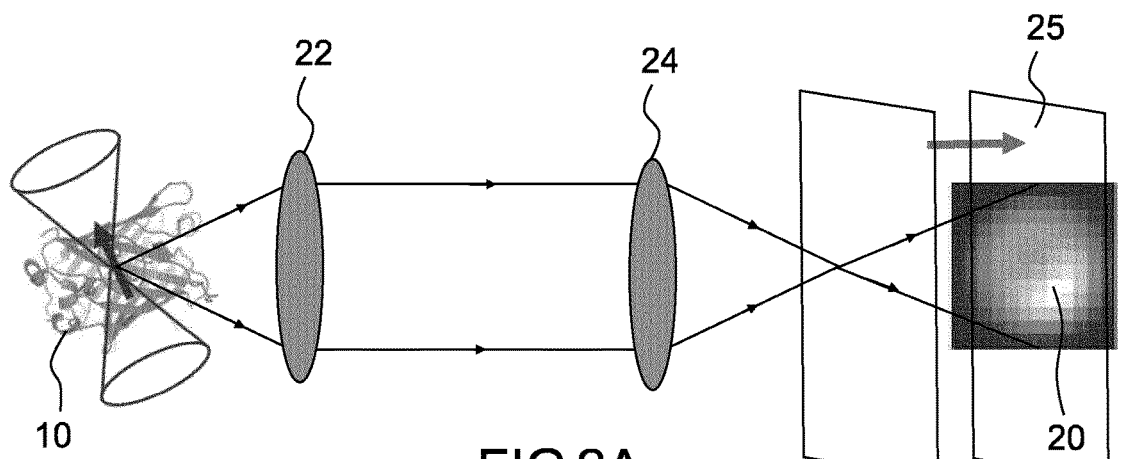
FIG. 2A (already described), schematic of a device according to the prior art.
Figure 2B:
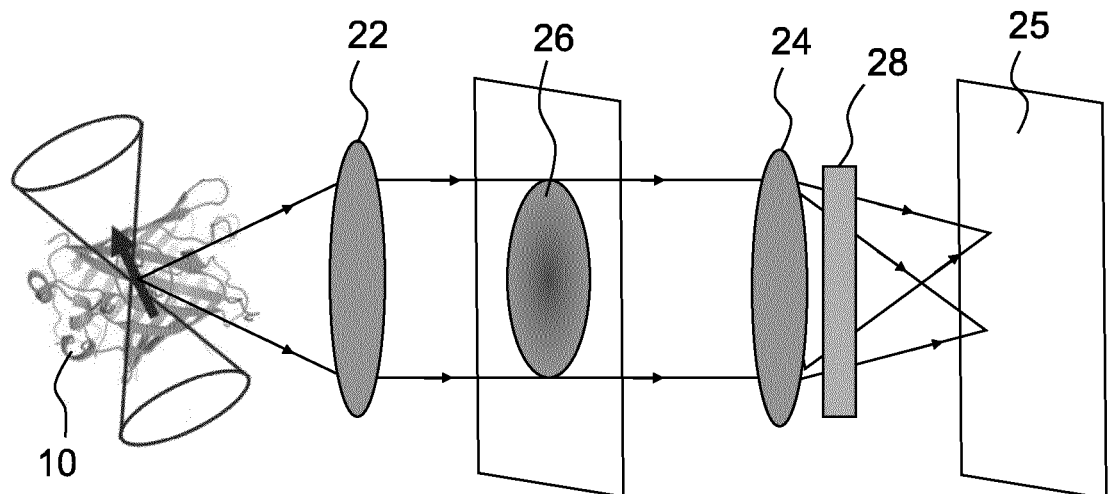
FIG. 2B (already described), schematic of another device according to the prior art.
Figure 2C:
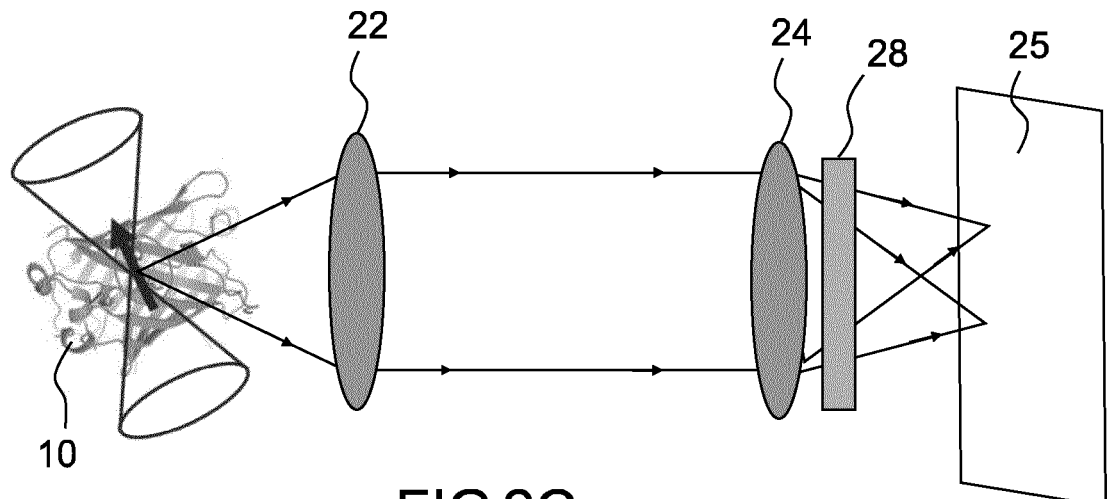
FIG. 2C (already described), schematic of another device according to the prior art.
Figure 3:
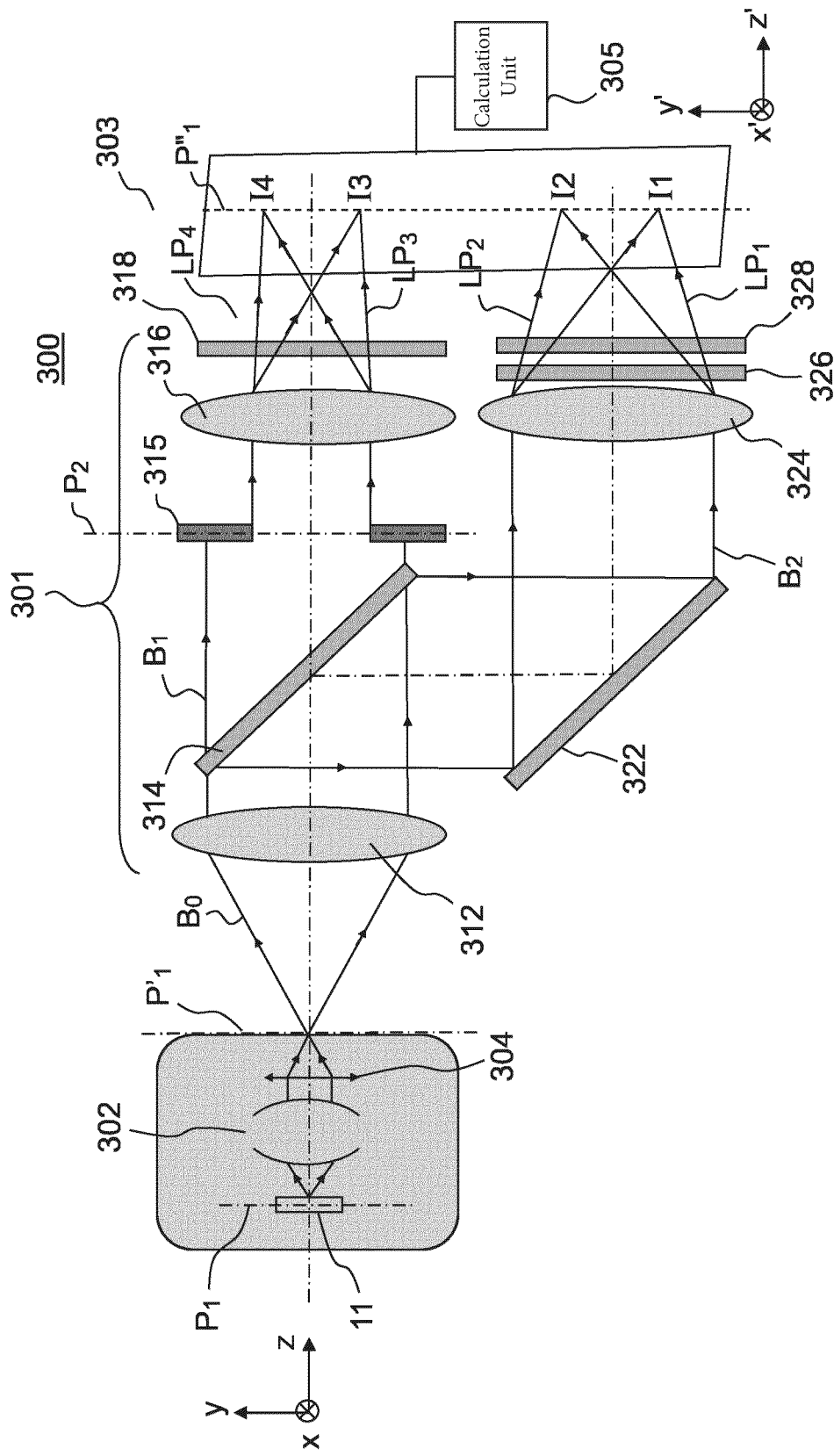
FIG. 3, schematic of a microscope system implementing a device according to an embodiment of the present description.

FIG. 3 is a schematic of a microscope system 300 implementing a device 301 according to an embodiment of the present description.

The microscope system 300 generally comprises a microscope objective lens 302 with a given numerical aperture NA and a detection unit 303. A specimen 11 with light emitting dipoles is positioned in a front focal plane $P_1$ of the microscope objective lens. In the example of FIG. 3, the microscope system further comprises a tube lens 304 forming an intermediate focal plane $P'_1$, optically conjugated with a plane of the specimen.

The microscope system illustrated in FIG. 3 is for example a wide field or TIR illumination microscope. However, the microscope system as shown in FIG. 3 may also comprise an illumination and/or a detection scheme adapted for other functionalities, for example scanned or descanned detection schemes.

The microscope system 300 further comprises a device 301 for the characterization of the 3D orientation of at least one emitting dipole within the specimen 11.

The device 301 comprises a non-polarizing beam splitter 314 configured to split a light beam $B_0$ emitted by at least one emitting dipole of the specimen and exiting the objective lens 302 and the tube lens 304, into first and second beams $B_1$, $B_2$, thus forming a first detection channel and a second detection channel.

The device 301 further comprises a spatial frequency filter 315 arranged in the first detection channel, and configured for spatially filtering the first beam to select a given range of spatial low frequencies. The spatial frequency filter 315 is positioned in a filtering plane $P_2$ conjugated with a back focal plane of the microscope objective lens 302.

In the example of FIG. 3, the device 301 further comprises a relay lens 312 for optically conjugating the back focal plane of the microscope with the filtering plane $P_2$.

Figure 4A:
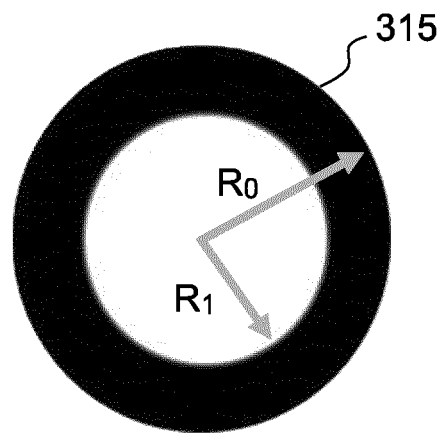
FIG. 4A, schematic of a spatial frequency filter according to an embodiment of the present description.

As shown in FIG. 4A, such spatial frequency filter 315 may work in transmission and comprise a disc-shaped aperture having an inner radius $R_1$ and an outer radius $R_0$. The outer radius is determined to cover the full detection aperture, i.e.:

$$R_0 \geq NA \cdot f/M$$

Where NA is the numerical aperture of the objective lens 302, f is the focal length of the relay lens 312 and M is the microscope magnification.

As it will be described in greater details, $R_1$ is determined such that a ratio $\alpha$ between the limited aperture of the filtered first beam in the filtering plane and the full aperture of said first beam only limited by the numerical aperture NA of the microscope objective lens, $\alpha = R_1 \cdot M/(NA \cdot f)$, is smaller than about 0.8, preferably comprised between about 0.2 and about 0.8, and more preferably comprised between about 0.5 and about 0.8.

Obviously, the spatial frequency filter 315 may also work in reflection. In that case, it may comprise for example an elliptic shaped mirror whose dimensions are determined to take into account the angle of incidence of the first beam on said mirror in order to achieve the desired spatial limitation of the first beam.

As shown in FIG. 3, the first and second detection channels comprise respectively a first polarizing beam splitter 318 and a second polarizing beam splitter 326, 328. The first and second polarizing beam splitters are configured to split respectively the filtered first beam and the second beam to provide four beams linearly polarized $LP_1$, $LP_2$, $LP_3$, $LP_4$, each having a specific direction of polarization.

The first polarizing beam splitter may comprise for example a Wollaston prism 318 or a polarizing beam splitter cube. In case of using a polarizing beam splitter cube, an extra mirror (not shown in FIG. 3) may be used to fold back towards the detection unit 303 one of the polarized beams that propagate with an angle 90° between each other.

The second polarizing beam splitter may comprise for example a Wollaston prism 328 before which is arranged a half wave plate 326 or a polarizing beam splitter cube before which is arranged a half wave plate 326.

The first and second detection channels may also comprise respectively a first lens 316 and a second lens 324 to optically conjugate the front focal plane $P_1$ and the detection plane $P''_1$.

The second detection channel further comprises a mirror 322 to direct the second beam towards the polarizing beam splitter 326, 328 and a detection unit 303.

The detection unit 303 may comprise a sensitive CCD (charge coupled device) camera or a scientific CMOS (sCMOS) camera. In the case of scanning microscopy (in both scanned and descanned versions), the detection unit may comprise a point detector such as a Photomultiplier or sensitive photodiode.

The detection unit 303 comprises a detection plane $P''_1$ optically conjugated with the plane $P_1$ of the specimen (or front focal plane of the microscope objective lens) and acquires 4 intensity images $I_1$, $I_2$, $I_3$, $I_4$ resulting from the detection of the four linearly polarized beams $LP_1$, $LP_2$, $LP_3$, $LP_4$.

The device 301 further comprises a calculation unit 305 configured to determine, from the four intensity images $I_1$, $I_2$, $I_3$, $I_4$ the mean orientation ($\rho$, $\eta$) and the angular aperture ($\delta$) of the distribution of the 3D orientation of at least one emitting dipole, as explained below.

Figure 4B:
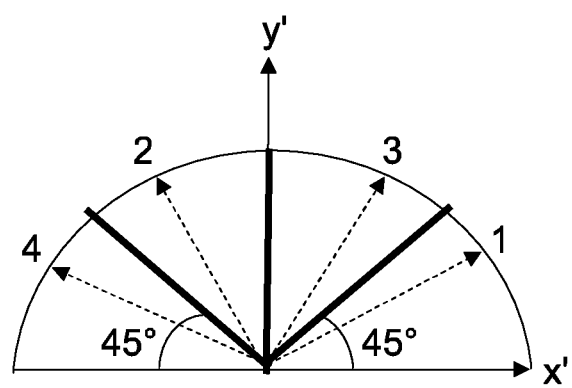
FIG. 4B, schematic of four directions of polarizations angularly spaced in four quadrants of the [0-180°] range of directions, according to an example.

The directions of polarizations i=1, 2, 3, 4 of the four linearly polarized beams $L_1$, $LP_2$, $LP_3$, $LP_4$ are for example located in four different quadrants of an angle extension between 0° and 180°, as shown in FIG. 4B.

The directions of polarization are defined in a frame (X', Y', Z') of the detection plane, wherein the frame (X', Y', Z') is optically conjugated with a predefined frame (X, Y, Z) of the specimen used to determine the mean orientation and angular aperture of the 3D orientation of at least one emitting dipole. More specifically, by convention in the present direction, the Z axis is parallel to an optical axis of the microscope objective lens. The directions of polarization are thus angularly spaced in the X'Y' plane, and by convention, the 0° direction of polarization is parallel to the X' direction, also referred below as the "horizontal axis".

A specific case is given below, in which the four image intensities ($I_0$, $I_{90}$, $I_{45}$, $I_{135}$).correspond to the projections in the polarization directions (0°, 90°, 45°, 135°) with respect to the horizontal axis (X').

Figure 5:
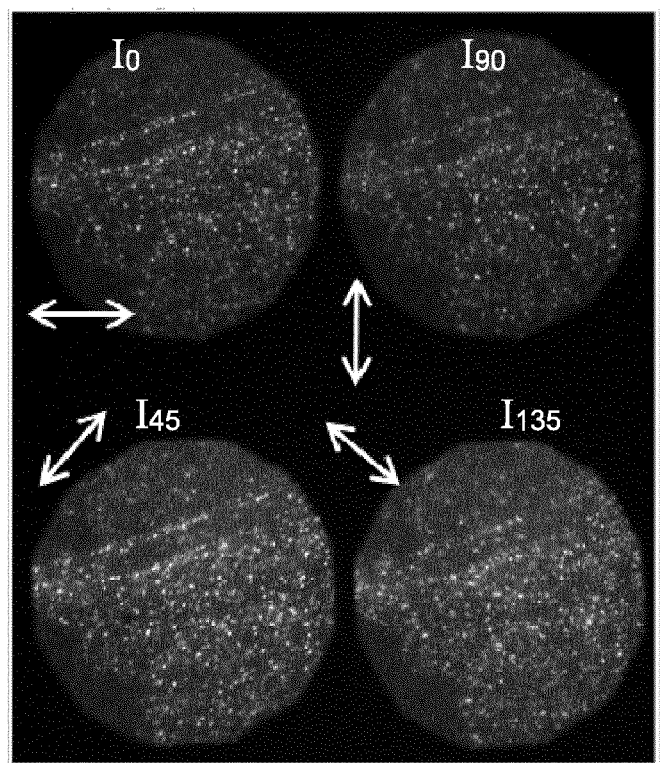
FIG. 5, experimental four intensity images of single molecules of AlexaFluor488 attached to actin fibers in fixed cells acquired for four different directions of polarization, according to an embodiment of the method according to the present description.

An example of such image intensities is shown in FIG. 5, in which image intensities are images of single molecules of AlexaFluor488 attached to actin fibers in fixed cells.

Images were obtained using a normal-incidence illumination of a cell with an illumination laser diode at 488 nm, and an objective lens of numerical aperture 1.45 for excitation and collection of the fluorescence signal. A ratio $\alpha$ between the apertures of the detection channels was fixed at 0.7. An emission bandpass filter centered on 525 nm (spectral width 30 nm) was used to filter the fluorescence signal. Each bright spot of the images represents the image of a fluorescent single molecule. The visible structures show actin fibers within the cell, each image full size is 30 µm.

The section below describes how the parameters ($\rho$, $\eta$, $\delta$) can be retrieved per pixel/region in an image, based on the measurement of the four intensities ($I_1$, $I_2$, $I_3$, $I_4$) resulting from detection of the four beams linearly polarized $LP_1$, $LP_2$, $LP_3$, $LP_4$.

For single molecule detection, the region of integration is the isolated point spread function of the single molecule (e.g. its image spot).

Figure 6A:
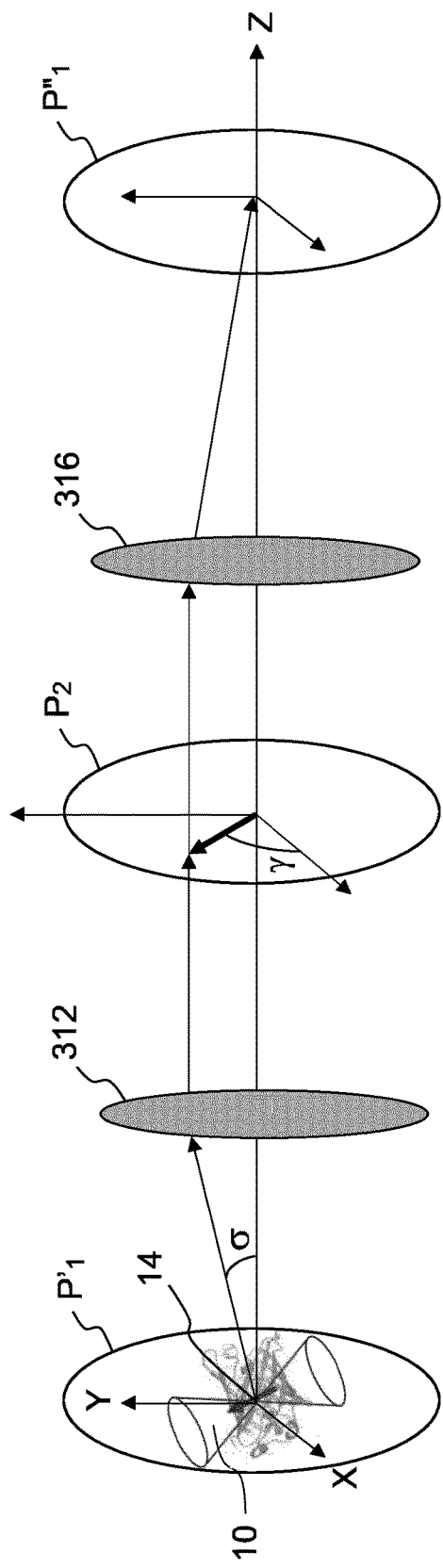
FIG. 6A, schematic of propagation of one dipole radiation.

As shown in FIG. 6A, we first consider a dipole $\mu$ (symbolized by an arrow 14) in the sample frame (X, Y, Z).

The radiated intensity $I_i^\mu$ along the analyser direction i can be expressed in the Fourier plane $P_2$ of the imaging system (or back focal plane image) with local cylindrical coordinates ($\sigma$, $\gamma$) (FIG. 6A). Even though the projection on the polarization direction is physically performed just before the image plane, it is convenient, for calculations, to express projected intensities right at the back focal plane, where the integrations over the used apertures are performed. Intensities calculated at the back focal plane are in the end equivalent to intensities calculated in the image plane.

Such radiated intensity $I_i^\mu$ along the analyser direction i can be defined based on the approached developed in A. S. Backer et al. ("*Determining the rotational mobility of a single molecule from a single image: a numerical study*", Optics Express 23(4), 4255-4276 (2015)):

$$I_i^\mu(\sigma, \gamma) = \begin{bmatrix} E_i^{X*}(\sigma, \gamma) & E_i^{Y*}(\sigma, \gamma) & E_i^{Z*}(\sigma, \gamma) \end{bmatrix} \cdot (\mu\mu^T)(\theta, \varphi) \cdot \begin{bmatrix} E_i^X(\sigma, \gamma) \\ E_i^Y(\sigma, \gamma) \\ E_i^Z(\sigma, \gamma) \end{bmatrix}$$

With $E_i^X(\sigma, \gamma)$ the component of the field radiated by the X component of the dipole, along the direction i. The field component, which only depends on ($\sigma$, $\gamma$) and the i direction projection in (X, Y), can be calculated following the formalism developed in D. Axelrod et al. ("*Fluorescence excitation and imaging of single molecules near dielectric-coated and bare surfaces: a theoretical study*", J. of Microscopy, 247, 147-160 (2012)), with expressions given in A. S. Backer et al.

The total intensity measured is the sum over all dipoles' directions explored during the measurement time and over the number of molecules detected in a given pixel.

Figure 6B:
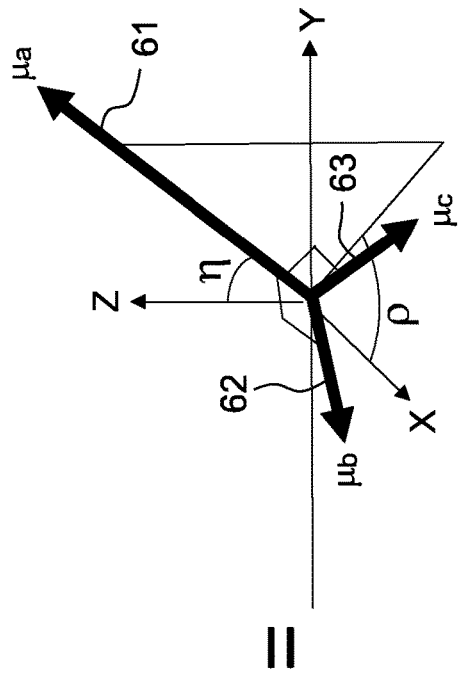
FIG. 6B, schematic of a dipole distribution within a cone, equivalent to three dipoles.
Figure 6B:
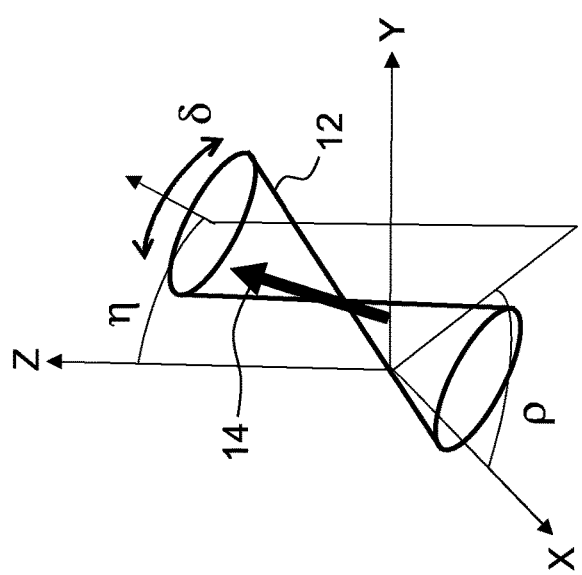

To model the corresponding dipole distribution, the method developed in A. S. Backer et al. is applied, which has demonstrated that a cone distribution of orientation ($\eta$, $\rho$) and aperture $\delta$ is equivalent to three orthogonal dipoles (61, 62, 63 FIG. 6B) $\mu_a(\eta, \rho)$, $$\mu_b\left(\frac{\pi}{2}, \rho - \frac{\pi}{2}\right), \mu_c = \mu_a \times \mu_b$$

with amplitudes $\lambda_a$, $\lambda_b$, $\lambda_c$:

$$\lambda_a = \frac{\cos^3\left(\frac{\delta}{2}\right) - 1}{3\left(\cos\left(\frac{\delta}{2}\right) - 1\right)}$$

$$\lambda_b = \lambda_c = \frac{\left(1 - \cos\left(\frac{\delta}{2}\right)\right)\left(2 + \cos\left(\frac{\delta}{2}\right)\right)}{6}$$

Note that $(\lambda_a+2\lambda_b)=1$ since the total dipole amplitude is normalized to 1.

The intensity in channel i=(1, 2, 3, 4) is therefore given by the sum of intensities from three dipoles:

$$I_i(\sigma,\gamma)=I_i^{\mu_a}(\sigma,\gamma)+I_i^{\mu_b}(\sigma,\gamma)+I_i^{\mu_c}(\sigma,\gamma)$$

To estimate the complete measured intensity in the channel i, the signal is summed over the corresponding back focal plane aperture (full numerical aperture for channels (1, 2), reduced numerical aperture for channels (3, 4)):

$$I_{i=1,2}=\int_{\gamma=0}^{2\pi}\int_{\sigma=0}^{\sigma_0}I_{i=1,2}(\sigma,\gamma)\sin\sigma d\sigma d\gamma$$

with $$\sigma_0 = a\sin\left(\frac{NA}{n}\right)$$

the numerical aperture angle for channels (1, 2)

$$I_{i=3,4}=\int_{\gamma=0}^{2\pi}\int_{\sigma=0}^{\sigma_1}I_{i=3,4}(\sigma,\gamma)\sin\sigma d\sigma d\gamma$$

with $$\sigma_1 = a\sin\left(\frac{\alpha \cdot NA}{n}\right)$$

the numerical aperture angle for channels (3, 4)

With NA the numerical aperture of the objective and n the refractive index of the immersion medium.

After development, the intensities $I_i$ are finally linear combinations of the dipoles' squared projections along directions (X,Y,Z) of the sample. These projections are named $M_{XX}$, $M_{YY}$, $M_{ZZ}$, and $M_{XY}$ in what follows, with:

$$M_{XX}=\epsilon_X^2(\mu_{a,X}^2+\mu_{b,X}^2+\mu_{c,X}^2)$$

$$M_{YY}=\epsilon_Y^2(\mu_{a,Y}^2+\mu_{b,Y}^2+\mu_{c,Y}^2)$$

$$M_{ZZ}=\epsilon_Z^2(\mu_{a,Z}^2+\mu_{b,Z}^2+\mu_{c,Z}^2)$$

$$M_{XY}=\epsilon_X\epsilon_Y(\mu_{a,X}\mu_{a,Y}+\mu_{b,X}\mu_{b,Y}+\mu_{c,X}\mu_{c,Y})$$

The coefficients $\epsilon_X$, $\epsilon_Y$ and $\epsilon_Z$ are introduced to account for the excitation efficiencies (e.g. excitation fields amplitudes) along the directions X,Y,Z. For wide field imaging at normal incidence, $\epsilon_X=\epsilon_Y=1$ and $\epsilon_Z=0$.

The four intensities $(I_1, I_2, I_3, I_4)$ can therefore be grouped in a matrix relation:

$$\begin{bmatrix}I_1\\I_2\\I_3\\I_4\end{bmatrix}=\begin{bmatrix}\kappa_{11}&\kappa_{21}&\kappa_{31}&\kappa_{41}\\\kappa_{12}&\kappa_{22}&\kappa_{32}&\kappa_{42}\\\kappa_{13}&\kappa_{23}&\kappa_{33}&\kappa_{43}\\\kappa_{14}&\kappa_{24}&\kappa_{34}&\kappa_{44}\end{bmatrix}\cdot\begin{bmatrix}M_{XX}\\M_{YY}\\M_{ZZ}\\M_{XY}\end{bmatrix}=K\cdot M$$

The K matrix contains all terms concerning the optical propagation (e.g. NA, polarization projection directions, $\alpha$, wavelength detected $\lambda$), while the M vector contains information on the dipoles' orientation parameters (e.g. ($\eta$, $\rho$) and $\delta$). They are explicited below.

The K matrix components are given by:

$$\kappa_{1,j} = \int_{\gamma=0}^{2\pi}\int_{\sigma=0}^{\sigma_0}E_j^X(\sigma,\gamma)E_j^{X*}(\sigma,\gamma)\sin\sigma\,d\sigma d\gamma$$

-continued $$\kappa_{2,j} = \int_{\gamma=0}^{2\pi}\int_{\sigma=0}^{\sigma_0}E_j^Y(\sigma,\gamma)E_j^{Y*}(\sigma,\gamma)\sin\sigma\,d\sigma d\gamma$$

$$\kappa_{3,j} = \int_{\gamma=0}^{2\pi}\int_{\sigma=0}^{\sigma_0}E_j^Z(\sigma,\gamma)E_j^{Z*}(\sigma,\gamma)\sin\sigma\,d\sigma d\gamma$$

$$\kappa_{4,j} = 2Re\int_{\gamma=0}^{2\pi}\int_{\sigma=0}^{\sigma_0}E_j^X(\sigma,\gamma)E_j^{Y*}(\sigma,\gamma)\sin\sigma\,d\sigma d\gamma$$

where j=(1,2).

Similarly, when j=3,4, $\kappa_{(1,2,3),(3,4)}$ and $\kappa_{4,(3,4)}$ write similarly as $\kappa_{(1,2,3),(1,2)}$ and $\kappa_{4,(1,2)}$ by replacing $\sigma_0$ with $\sigma_1$.

Note that in the specific case of a projection along the (0°,90°,45°,135°) directions, the matrix K simplifies into a more reduced form, with "0" values making the inversion quicker and easier:

$$\begin{bmatrix}I_0\\I_{90}\\I_{45}\\I_{135}\end{bmatrix}=\begin{bmatrix}\kappa_1&\kappa_2&\kappa_3&0\\\kappa_2&\kappa_1&\kappa_3&0\\\kappa_4&\kappa_4&\kappa_5&\kappa_6\\\kappa_4&\kappa_4&\kappa_5&\kappa_6\end{bmatrix}\begin{bmatrix}M_{XX}\\M_{YY}\\M_{ZZ}\\M_{XY}\end{bmatrix}=K\cdot M$$

The M vector components are given by:

$$M_{XX} = \lambda_a\sin^2\eta\,\cos^2\rho + \lambda_b\left[\frac{1}{4}(\cos^2\eta+1)\sin^22\rho+\sin^4\rho+\cos^2\eta\,\cos^4\rho\right]$$

$$M_{YY} = \lambda_a\sin^2\eta\,\sin^2\rho + \lambda_b\left[\frac{1}{4}(\cos^2\eta+1)\sin^22\rho+\cos^4\rho+\cos^2\eta\,\sin^4\rho\right]$$

$$M_{ZZ} = \lambda_a\cos^2\eta + \lambda_b\sin^2\eta$$

$$M_{XY} = \frac{1}{2}\sin 2\rho\,\sin^2\eta(\lambda_a-\lambda_b)$$

With $(\lambda_a+2\lambda_b)=1$.

It is then described below how the parameters are retrieved.

First, the vector $M=(M_{XX}, M_{YY}, M_{ZZ}, M_{XY})^T$ (where T symbolizes the transpose of a matrix) is retrieved from the measured intensities $I=(I_1, I_2, I_3, I_4)^T$ by an inversion of the matrix K:

$$M=K^{-1}\cdot I$$

In the specific case of polarization detection directions (0°,90°,45°,135°), with NA=1.45, n=1.515, $\alpha$=0.7 and using a wavelength $\lambda$=520 nm, then $K^{-1}$ is given by:

$$K^{-1}=\begin{bmatrix}0.092&-0.166&0.419&0.419\\-0.166&0.092&0.419&0.419\\0.201&0.201&-0.612&-0.612\\0&0&0.309&-0.309\end{bmatrix}$$

Second, the parameters ($\rho$, $\eta$, $\delta$) are retrieved from the quantities ($M_{XX}$, $M_{YY}$, $M_{ZZ}$, $M_{XY}$) We use combinations of these quantities, normalized to their sum, to defined new factors:

$$P_{XY} = \frac{M_{XX}-M_{YY}}{M_{XX}+M_{YY}+M_{ZZ}} = \cos 2\rho\sin^2\eta(\lambda_a-\lambda_b)$$

$$P_{UV} = \frac{2M_{XY}}{M_{XX}+M_{YY}+M_{ZZ}} = \sin 2\rho\sin^2\eta(\lambda_a-\lambda_b)$$

-continued
$$P_Z = \frac{M_{ZZ}}{M_{XX} + M_{YY} + M_{ZZ}} = \lambda_a - \sin^2\eta(\lambda_a - \lambda_b)$$

Which allow to finally retrieve the searched parameters:

$$\rho = 1/2\tan^{-1}\frac{P_{UV}}{P_{XY}}$$

$$\eta = \sin^{-1}\sqrt{\frac{2P_{XY}}{\cos 2\rho(3\lambda_a - 1)}} \text{ with } \lambda_a = P_Z + \sqrt{P_{XY}^2 + P_{UV}^2}$$

$$\delta = 2\cos^{-1}\left(\frac{\sqrt{12\lambda_a - 3} - 1}{2}\right)$$

It is thus possible to retrieve from all four image intensities derived from the four beams linearly polarized, the mean orientation and the angular aperture of the distribution of the 3D orientation of isolated emitting dipoles. The applicants have shown that by choosing directions of polarizations angularly spaced in four separate quadrants in the [0°-180] range of directions, inversion of the K matrix in unambiguous, while in other cases, uncertainties may limit the precision of the final results.

Further, with the method for characterization as described above, even characterization of emitting dipoles in dense specimen is possible. In dense specimen, each pixel of the image represents the optical response from a collection of dipoles spatially averaged within the size of the optical resolution of the microscope objective, and temporally averaged over the integration time of the intensity images. This collection of dipoles represents a distribution, oriented towards a given 3D mean direction within a cone of aperture which comprises the wobbling of each individual dipoles as well as the alignment aperture of all dipoles.

Figure 7A:
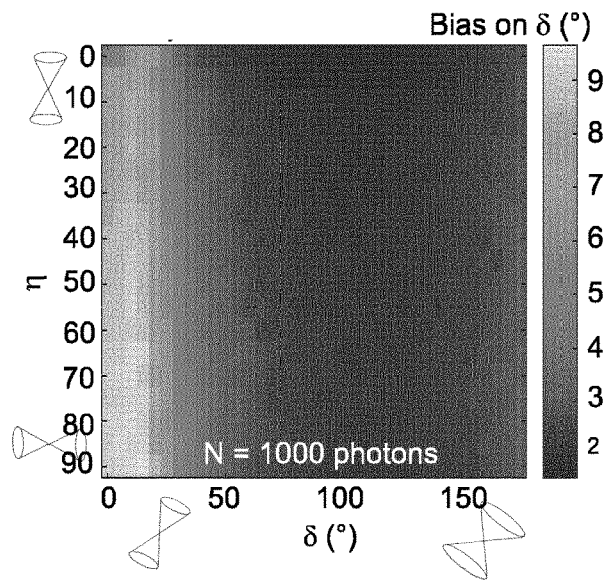
FIGS. 7A-7C, simulations of parameters ($\rho$, $\eta$, $\delta$) retrieval.
Figure 7B:
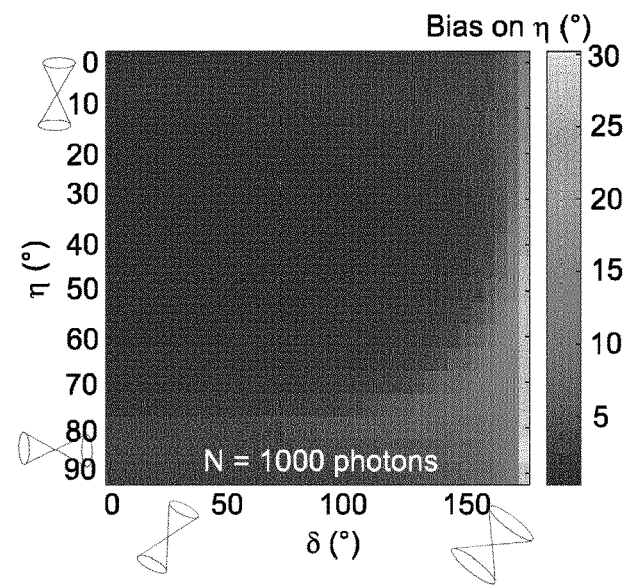
Figure 7C:
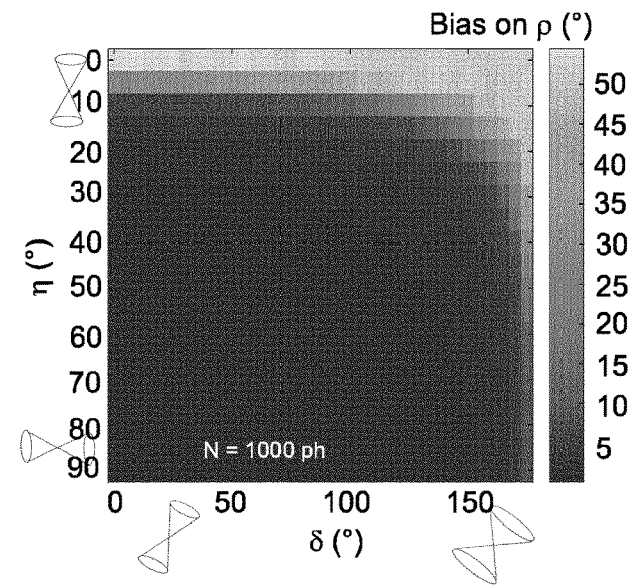

FIGS. 7A-7C show the results of simulations that confirms the feasibility of the method according to the description to retrieve 3D orientation parameters.

A series of image intensities data ($I_1$, $I_2$, $I_3$, $I_4$) were generated directly from the matrix equation I=K. M, starting from variable values of ($\rho$, $\eta$, $\delta$).

More specifically, ($I_1$, $I_2$, $I_3$, $I_4$) are deduced from the relation:

$$\begin{bmatrix} I_0 \\ I_{90} \\ I_{45} \\ I_{135} \end{bmatrix} = \begin{bmatrix} 4.423 & 0.551 & 3.406 & 0 \\ 0.551 & 4.423 & 3.406 & 0 \\ 0.818 & 0.818 & 0.304 & 1.617 \\ 0.818 & 0.818 & 0.304 & -1.617 \end{bmatrix} \cdot \begin{bmatrix} M_{XX} \\ M_{YY} \\ M_{ZZ} \\ M_{XY} \end{bmatrix}$$

Written for the case of a polarization detection directions (0°,90°,45°,135°), NA=1.45, n=1.515, $\alpha$=0.7 and using a wavelength $\lambda$=520 nm. The vector M contains values calculated for each dataset ($\rho$, $\eta$, $\delta$):

$$M_{XX} = \frac{\cos^3\left(\frac{\delta}{2}\right) - 1}{3\left(\cos\left(\frac{\delta}{2}\right) - 1\right)}\sin^2\eta\cos^2\rho +$$

$$\frac{\left(1 - \cos\left(\frac{\delta}{2}\right)\right)\left(2 + \cos\left(\frac{\delta}{2}\right)\right)}{6}\left[\frac{1}{4}(\cos^2\eta + 1)\sin^2 2\rho + \sin^4\rho + \cos^2\eta\cos^4\rho\right]$$

-continued
$$M_{YY} = \frac{\cos^3\left(\frac{\delta}{2}\right) - 1}{3\left(\cos\left(\frac{\delta}{2}\right) - 1\right)}\sin^2\eta\sin^2\rho +$$

$$\frac{\left(1 - \cos\left(\frac{\delta}{2}\right)\right)\left(2 + \cos\left(\frac{\delta}{2}\right)\right)}{6}\left[\frac{1}{4}(\cos^2\eta + 1)\sin^2 2\rho + \cos^4\rho + \cos^2\eta\sin^4\rho\right]$$

$$M_{ZZ} = \frac{\cos^3\left(\frac{\delta}{2}\right) - 1}{3\left(\cos\left(\frac{\delta}{2}\right) - 1\right)}\cos^2\eta + \frac{\left(1 - \cos\left(\frac{\delta}{2}\right)\right)\left(2 + \cos\left(\frac{\delta}{2}\right)\right)}{6}\sin^2\eta$$

$$M_{XY} = \frac{1}{2}\sin 2\rho\sin^2\eta\left(\frac{\cos^3\left(\frac{\delta}{2}\right) - 1}{3\left(\cos\left(\frac{\delta}{2}\right) - 1\right)} - \frac{\left(1 - \cos\left(\frac{\delta}{2}\right)\right)\left(2 + \cos\left(\frac{\delta}{2}\right)\right)}{6}\right)$$

This generates a collection of data, which is then noised; said collection of data is treated by inverting the same matrix K, as experimental data would be treated, e.g. deduce a vector M is deduced from M=$K^{-1}$·I. This gives a "simulated" determination of ($\rho$, $\eta$, $\delta$) that can be compared to expected values. This generates a 'bias=retrieved value−expected value' which is reported in the graphs.

More specifically, the simulation is based on 500 realizations, which starting parameters are known ($\delta$, $\eta$, $\rho$) values. These values are then varied every few degrees for ($\delta$, $\eta$) and $\rho$=20° and for each of them, the bias (difference between retrieved value and expected value) is reported. Noise is applied as Poisson noise on the simulated intensities, supposing a total intensity of N=1000 photons (which is a low value for single molecules detection).

The measurements conditions are: polarization detection directions (0°,90°,45°,135°), NA=1.45, n=1.515, $\alpha$=0.7, wavelength $\lambda$=520 nm. The simulation of parameters retrieval is achieved with a total intensity N=1000 photons, a signal to noise ratio SNR=10.

The graphs FIGS. 7A-7C show the bias obtained on the quantities $\delta$, $\eta$, $\rho$ (respectively 7A, 7B, 7C). The bias is defined by the 'retrieved value' using the approach described here, minus the 'expected value'.

All parameters can be retrieved with bias less than a few degrees even in the presence of noise. Only three cases show an increase of bias (which still remains very small): very low $\delta$, $\delta\sim180°$ when measuring $\eta$, and $\eta\sim0°$ when measuring $\rho$. These cases can be explained by the fact that in these extreme situations, the searched angles cannot be physically defined.

Although described by way of a number of detailed example embodiments, the systems and methods according to the present description comprise various variants, modifications and improvements that will be obvious to those skilled in the art, it being understood that these various variants, modifications and improvements fall within the scope of the invention such as defined by the following claims.

The invention claimed is:

1. A method for the characterization of the 3D orientation of at least one emitting dipole (10) within a specimen, wherein the specimen is positioned in a front focal plane of a microscope objective lens with a given numerical aperture, the method comprising:
   splitting a light beam emitted by said at least one emitting dipole and exiting said objective lens into a first and a second beams, wherein the first beam is directed to a first detection channel and the second beam is directed to a second detection channel;

spatially filtering said first beam to select a given range of spatial low frequencies of said first beam, by using a spatial frequency filter arranged in a filtering plane of the first detection channel, wherein said filtering plane is optically conjugated with a back focal plane of said microscope objective lens;

splitting each of said filtered first beam and said second beam into two beams linearly polarized, thus providing four beams linearly polarized having four different directions of polarization;

detecting with an optical detection unit said four beams linearly polarized in a detection plane optically conjugated with the front focal plane of said microscope objective lens, thus forming four intensity images of said at least one emitting dipole;

determining, from said four intensity images, in a predefined frame of the specimen, the mean orientation and the angular aperture of the distribution of the 3D orientation of said at least one emitting dipole, during an acquisition time of said four intensity images.

2. The method according to claim 1, wherein said spatial filtering of said first beam results from a spatial limitation of the aperture of said first beam in said filtering plane.

3. The method according to claim 2, wherein a ratio between said limited aperture of said first beam in the filtering plane and a full aperture of said first beam is comprised between about 0.2 and about 0.8.

4. The method according to claim 1, wherein said four directions of polarization are angularly spaced in four separate quadrants of a [0-180°] range of directions.

5. The method according to claim 1, wherein determining the mean orientation and the angular aperture of the distribution of the 3D orientation of said at least one emitting dipole comprises:
   deriving from said four intensity images, a first column vector;
   determining an optical propagation matrix based on said four directions of polarization of said linearly polarized beams and said range of spatial low frequencies of said filtered first beam;
   deriving a second column vector from the product of the first column vector and the inverse matrix of the optical matric propagation;
   deriving from the components of said second column vector the mean orientation and the angular aperture of the distribution of the 3D orientation of said at least one emitting dipole.

6. The method according to claim 1, wherein 3D orientation of a dense specimen is characterized, each pixel of each of said four intensity images representing an optical response from a collection of emitting dipoles spatially averaged within the size of an optical resolution of the microscope objective lens.

7. A device for the characterization of the 3D orientation of at least one emitting dipole within a specimen, wherein said device is configured to be connected to a microscope system comprising a microscope objective lens with a given numerical aperture and a detection unit having a detection plane optically conjugated with a front focal plane of said microscope objective lens, the device comprising:
   A non-polarizing beam splitter configured to split a light beam emitted by said at least one emitting dipole of the specimen positioned in a front focal plane of said microscope objective lens and exiting said objective lens, into a first and a second beams, wherein the first beam is directed to a first detection channel and the second beam is directed to a second detection channel;
   a spatial frequency filter arranged in the first detection channel, configured for spatially filtering said first beam to select a given range of spatial low frequencies of said first beam, wherein said spatial frequency filter is configured to be positioned in a filtering plane conjugated with a back focal plane of said microscope objective lens when said device is connected to said microscope system;
   in each of said first and second detection channels, respectively a first polarizing beam splitter and a second polarizing beam splitter, wherein said first and second polarizing beam splitters are configured to split each of said filtered first beam and second beam into two beams linearly polarized, thus providing four beams linearly polarized having four different directions of polarization;
   a calculation unit configured to determine, from four intensity images resulting from the detection of said four beams linearly polarized by the detection unit in said detection plane, the mean orientation and the angular aperture of the distribution of the 3D orientation of said at least one emitting dipole, in a predefined frame of the specimen, during an acquisition time of said four images.

8. The device according to claim 7, wherein said spatial frequency filter is configured to spatially limit the aperture of said first beam in said filtering plane by comparison to a full aperture of said first beam, wherein said full aperture is only limited by the numerical aperture of the microscope objective lens.

9. The device according to claim 8, wherein a ratio between said limited aperture and said full aperture is comprised between about 0.2 and about 0.8.

10. The device according to claim 8, wherein said spatial frequency filter is configured to work in transmission and comprises a disc shaped aperture having a given inner radius.

11. The device according to claim 8, wherein said four directions of polarization are angularly spaced in four separate quadrants of the [0-180°] range of directions.

12. The device according to claim 8, further comprising a relay lens for optically conjugating the back focal plane of the microscope with said filtering plane.

13. A microscope system comprising a microscope objective lens with a given numerical aperture, a detection unit having a detection plane optically conjugated with a front focal plane of said microscope objective lens, and a device according to claim 8.

14. The microscope system according to claim 13, wherein said microscope is configured to work in one of the following illumination configurations: wide field illumination, TIR illumination, scanning illumination.

15. The microscope system according to claim 13, wherein said microscope is configured to work in one of the following detection configurations: pure wide field fluorescence imaging, STORM, PALM, nonlinear imaging.

* * * * *